US010103989B2

(12) United States Patent
Wood

(10) Patent No.: US 10,103,989 B2
(45) Date of Patent: Oct. 16, 2018

(54) CONTENT OBJECT RETURN MESSAGES IN A CONTENT CENTRIC NETWORK

(71) Applicant: CISCO TECHNOLOGY, INC., San Jose, CA (US)

(72) Inventor: Christopher A. Wood, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 129 days.

(21) Appl. No.: 15/181,039

(22) Filed: Jun. 13, 2016

(65) Prior Publication Data
US 2017/0359260 A1 Dec. 14, 2017

(51) Int. Cl.
G06F 11/00 (2006.01)
H04L 12/743 (2013.01)
H04L 12/733 (2013.01)
G06F 11/20 (2006.01)
H04L 29/06 (2006.01)
G06F 11/07 (2006.01)
(Continued)

(52) U.S. Cl.
CPC ...... H04L 45/7453 (2013.01); G06F 11/0709 (2013.01); G06F 11/2007 (2013.01); H04L 41/00 (2013.01); H04L 45/122 (2013.01); H04L 45/28 (2013.01); H04L 63/123 (2013.01); G06F 2201/85 (2013.01)

(58) Field of Classification Search
CPC . H04L 45/7453; H04L 45/122; G06F 11/2007
See application file for complete search history.

(56) References Cited

U.S. PATENT DOCUMENTS 817,441 A 4/1906 Niesz
4,309,569 A 1/1982 Merkle
(Continued)

FOREIGN PATENT DOCUMENTS

DE 1720277 A1 6/1967
DE 19620817 A1 11/1997
(Continued)

OTHER PUBLICATIONS

Content centric networking, Sep. 14, 2014, Wikipedia, pp. 1-3.*
(Continued)

Primary Examiner — Bryce P Bonzo
Assistant Examiner — Jonathan D Gibson

(57) ABSTRACT

One embodiment provides a system that indicates conditions associated with received content. During operation, the system generates, by a first computing device, an interest message which includes a name, wherein the interest message further includes a verification token which is a hash of a nonce. In response to transmitting the interest message to a second computing device, the system receives a content object message which includes a same name as the name for the interest message. In response to detecting a condition associated with the content object message, the system generates a content object return message which includes the nonce and a same name as the name for the content object message. The system forwards the content object return message to the second computing device, thereby facilitating the second computing device to process the content object return message.

20 Claims, 8 Drawing Sheets

(51) Int. Cl.
*H04L 12/24* (2006.01)
*H04L 12/703* (2013.01)

(56) References Cited

U.S. PATENT DOCUMENTS

| | | | |
|---|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 * | 6/2012 | Jacobson .............. H04L 45/748 370/392 |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 * | 2/2013 | Jacobson .............. H04L 67/104 709/219 |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 * | 6/2014 | Qian .................... H04L 67/327 709/241 |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |

(56) References Cited

U.S. PATENT DOCUMENTS

| | | |
|---|---|---|
| 9,032,095 B1 | 5/2015 | Traina |
| 9,071,498 B2 | 6/2015 | Beser |
| 9,112,895 B1 | 8/2015 | Lin |
| 9,253,087 B2 | 2/2016 | Zhang |
| 9,280,610 B2 | 3/2016 | Gruber |
| 9,774,531 B2* | 9/2017 | Azgin ................ H04L 45/7453 |
| 9,781,038 B2* | 10/2017 | Liu ...................... H04L 45/745 |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |

(56) References Cited

U.S. PATENT DOCUMENTS

| | | |
|---|---|---|
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1* | 11/2009 | Jacobson ............ G06F 15/173 726/22 |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1* | 11/2011 | Lee ................. H04W 36/023 370/331 |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |

(56) References Cited

U.S. PATENT DOCUMENTS

| | | |
|---|---|---|
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0275618 A1* | 10/2013 | Puttaswamy Naga ........................ H04L 67/2842 709/236 |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1* | 1/2014 | Liu ........................ H04L 67/18 709/217 |
| 2014/0033193 A1 | 1/2014 | Palaniappan |
| 2014/0040505 A1 | 2/2014 | Barton |
| 2014/0040628 A1 | 2/2014 | Fort |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0237095 A1 | 5/2014 | Petker |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1* | 9/2014 | Zhang ................... H04L 9/3268 713/158 |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1* | 1/2015 | Franck ................... H04L 63/04 713/171 |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0349961 A1 | 12/2015 | Mosko |
| 2015/0350078 A1* | 12/2015 | Azgin ................... H04L 45/306 370/392 |
| 2015/0372903 A1 | 12/2015 | Hui |
| 2015/0381546 A1 | 12/2015 | Mahadevan |
| 2016/0019110 A1* | 1/2016 | Mosko ................. G06F 11/0784 714/57 |
| 2016/0021172 A1* | 1/2016 | Mahadevan ...... G06F 17/30598 709/204 |
| 2016/0044126 A1* | 2/2016 | Mahadevan ........ H04L 67/2842 709/213 |
| 2016/0072715 A1* | 3/2016 | Mahadevan ........ H04L 47/2466 370/236 |
| 2017/0078199 A1* | 3/2017 | Mosko ................. H04L 45/7453 |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2120402 | 11/2009 |
| EP | 2120419 | 11/2009 |
| EP | 2124415 A2 | 11/2009 |
| EP | 2214357 A1 | 8/2010 |
| EP | 2323346 | 5/2011 |
| EP | 2978174 A1 | 1/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |
| WO | 2013123410 | 8/2013 |
| WO | 2015084327 | 6/2015 |

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.

Koponen, Teemu et al., "A Data-Oriented (and Beyond) Network Architecture", SIGCOMM '07, Aug. 27-31, 2007, Kyoto, Japan, XP-002579021, p. 181-192.

(56) References Cited

OTHER PUBLICATIONS

Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
"PBC Library-Pairing-Based Cryptography—About," http://crypto.stanford.edu/pbc. downloaded Apr. 27, 2015.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
Boneh et al., "Collusion Resistant Broadcast Encryption With Short Ciphertexts and Private Keys", 2005.
D. Boneh and M. Franklin. Identity-Based Encryption from the Weil Pairing. Advances in Cryptology—Crypto 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {2013, Aug.). Less pain, most of the gain: Incrementally deployable ICN. In ACM SIGCOMM Computer Communication Review (vol. 43, No. 4, pp. 147-158). ACM.
Anteniese et al., "Improved Proxy Re-Encryption Schemes with Applications to Secure Distributed Storage", 2006.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.

(56) References Cited

OTHER PUBLICATIONS

Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Xiong et al., "CloudSeal: End-to-End Content Protection in Cloud-based Storage and Delivery Services", 2012.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA—Secure Proxy Re-Encryption without Pairings. Public Key Cryptography. Springer Lecture Notes in Computer ScienceVolume 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
Gopal et al. "Integrating content-based Mechanisms with hierarchical File systems", Feb. 1999, University of Arizona, 15 pages.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

(56) References Cited

OTHER PUBLICATIONS

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/ documents/ Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Walker, Iain S. Best practices guide for residential HVAC Retrofits. No. LBNL-53592. Ernest Orlando Lawrence Berkeley National Laboratory, Berkeley, CA (US), 2003.
Wang, Jiangzhe et al.,"DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
Soh et al., "Efficient Prefix Updates for IP Router Using Lexicographic Ordering and Updateable Address Set", Jan. 2008, IEEE Transactions on Computers, vol. 57, No. 1.
Beben et al., "Content Aware Network based on Virtual Infrastructure", 2012 13th ACIS International Conference on Software Engineering.
Biradar et al., "Review of multicast routing mechanisms in mobile ad hoc networks", Aug. 16, Journal of Network and Computer Applications 35 (2012) 221-229.
D. Trossen and G. Parisis, "Designing and realizing and information-centric Internet," IEEE Communications Magazing, vol. 50, No. 7, pp. 60-67, Jul. 2012.
Garcia-Luna-Aceves et al., "Automatic Routing Using Multiple Prefix Labels", 2012, IEEE, Ad Hoc and Sensor Networking Symposium.
Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
J. Lotspiech, S. Nusser, and F. Pestoni. Anonymous Trust: Digit.
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.

(56) References Cited

OTHER PUBLICATIONS

Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).

Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.

Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.

Tiancheng Zhuang et al. "Managing Ad Hoc Networks of Smartphones", International Journal of Information and Education Technology, Oct. 1, 2013.

Amadeo et al. "Design and Analysis of a Transport-Level Solution for Content-Centric VANETs", University "Mediterranea" of Reggio Calabria, Jun. 15, 2013.

Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].

Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.

Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], [0013]* *figures 1,2* .

Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.

International Search Report and Written Opinion in counterpart International Application No. PCT/US2017/037297, dated Jul. 31, 2017, 12 pages.

Mosko, et al., "CCNx Semantics," draft-irtf-icnrg-ccnxsemantics-02, ICNRG, Internet Draft, Apr. 4, 2016, 26 pages.

Mosko, et al., "CCN 1.0 Protocol Architecture," retrieved from https://pdfs.semanticscholar.org/292f/34b5def59108a11aee902916ff5580967fe8.pdf, Feb. 5, 2018, 10 pages.

\* cited by examiner

CONTENT OBJECT RETURN MESSAGES IN A CONTENT CENTRIC NETWORK

RELATED APPLICATION

The subject matter of this application is related to the subject matter in the following applications:

- U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814"); and
- U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175");
- U.S. Pat. No. 8,204,060, entitled "METHOD AND SYSTEM FOR FACILITATING FORWARDING A PACKET IN A CONTENT-CENTRIC NETWORK," by inventors Van L. Jacobson and James D. Thornton, filed 17 Dec. 2009 (hereinafter "U.S. Pat. No. 8,204,060");
- U.S. Pat. No. 8,386,622, entitled "METHOD AND APPARATUS FOR FACILITATING COMMUNICATION IN A CONTENT CENTRIC NETWORK," by inventor Van L. Jacobson, filed 11 Dec. 2008 (hereinafter "U.S. Pat. No. 8,386,622"); and
- U.S. patent application Ser. No. 14/334,530, entitled "INTEREST RETURN CONTROL MESSAGE," by inventors Marc E. Mosko, Ignacio Solis, and Ersin Uzun, filed 17 Jul. 2014 (hereinafter "U.S. patent application Ser. No. 14/334,530");

the disclosures of which are herein incorporated by reference in their entirety.

BACKGROUND

Field

This disclosure is generally related to distribution of digital content. More specifically, this disclosure is related to a system for explicitly deleting content which is cached at intermediate routers in a CCN.

Related Art

The proliferation of the Internet and e-commerce continues to create a vast amount of digital content. Content-centric network (CCN) architectures have been designed to facilitate accessing and processing such digital content. A CCN includes entities, or nodes, such as network clients and consumers, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level. As an interest is routed through the network from a consumer to a producer, each intermediate CCN router adds an entry in its pending interest table (PIT) corresponding to the interest and forwards the interest to the next CCN router. When a matching content object is generated by and sent from the producer back to the consumer, the content object follows the reverse path of the interest. Each intermediate CCN router can cache a copy of the content object in a local content store (CS), which allows the router to fulfill a subsequent interest for the content from its cache.

In addition to interest and content object messages, a current CCN protocol also supports interest return messages. A first CCN node can forward an interest to a second CCN node. The second CCN node can receive the interest, encounter errors in processing the interest (such as no available route), and generate an interest return message. The interest return message conveys information to a requesting entity (e.g., the first CCN node or another downstream node) about a problem or condition that occurs while trying to retrieve the requested content object. The first CCN node (or other downstream entity) can use the interest return message to make local forwarding decisions, e.g., to find the desired content along another link. Interest return messages are described in U.S. patent application Ser. No. 14/334,530. However, the current CCN protocol does not provide for a message that is analogous to the interest return message, i.e., a message which conveys information to an upstream entity about a problem or condition that occurs while processing a received content object.

SUMMARY

One embodiment provides a system that communicates information about a previously received content object. During operation, the system generates, by a first computing device, an interest message which includes a name and a verification token which is a hash of a nonce, wherein a name is a hierarchically structured variable length identifier that includes contiguous name components ordered from a most general level to a most specific level. In response to transmitting the interest message to a second computing device, the system receives a content object message which includes a same name as the name for the interest message. In response to detecting a condition associated with the content object message, the system generates a content object return message which includes the nonce and a same name as the name for the content object message. The system forwards the content object return message to the second computing device, thereby facilitating the second computing device to process the content object return message.

In some embodiments, the system generates the nonce randomly, and computes the verification token by performing the hash on the nonce.

In some embodiments, in response to detecting the error condition, the system refrains from forwarding the content object to a downstream node, and refrains from storing the content object in a local cache of the first computing device.

In some embodiments, the system performs a signature verification of the content object. The system determines that the signature verification is unsuccessful. The system indicates in the content object return message that the signature verification is unsuccessful.

In some embodiments, the system performs a lookup in a pending interest table of the first computing device based on the name for the content object message. The system determines from the lookup that no corresponding entry exists in the pending interest table of the first computing device. The system indicates in the content object return message that no corresponding entry exists in the pending interest table of the first computing device.

In some embodiments, the system determines a number incoming interfaces corresponding to an entry in a pending interest table of the first computing device based on the name for the interest message. The system indicates in the content object return message the number of incoming interfaces.

In some embodiments, the first computing device and the second computing device communicate via a respective forwarder associated with each computing device, and the second computing device is a next-hop node of the first computing device.

Another embodiment provides a system that communicates information about a previously received content object. During operation, the system receives, by a second computing device from a first computing device, an interest message which includes a name and a first verification token which is a hash of a first nonce, wherein a name is a hierarchically structured variable length identifier that includes contiguous name components ordered from a most general level to a most specific level. The system retrieves a content object message which includes a same name as the name for the interest message. The system stores in a local cache of the second computing device the content object message and the first verification token. In response to transmitting the content object message to the first computing device, the system receives a content object return message which includes the first nonce and a same name as the name for the content object message. The system processes the content object return message based on the name for the content object return message, the first nonce, and the stored first verification token.

In some embodiments, in response to determining that the second computing device has a local cache, the system performs the following operations: computes a second verification token which is a hash of a second nonce; replaces, in the interest message, the first verification token with the second verification token; stores in a data structure the name for the interest message, the first verification token, and the second verification token; and transmits the interest message to an upstream node. In response to determining that the second computing device does not have a local cache, the system transmits the interest message to an upstream node.

In some embodiments, the first verification token is associated with an incoming interface, and the second verification token is associated with an outgoing interface.

In some embodiments, the system computes a third verification token by performing a hash on the first nonce included in the content object return message. The system determines whether the third verification token matches the first verification token included in the interest message.

In some embodiments, the content object return message indicates that a signature verification performed by the first computing device is unsuccessful or that no corresponding entry exists in a pending interest table of the first computing device based on the name for the content object message. The system processes the content object return message by one or more of: removing from the local cache the content object message; and shutting down a link associated with an upstream node from which the content object is received.

In some embodiments, the content object return message indicates a number of incoming interfaces corresponding to an entry in a pending interest table of the first computing device based on the name for the interest message. The system processes the content object return message by performing an action based on the number of incoming interfaces.

BRIEF DESCRIPTION OF THE FIGURES

In the figures, like reference numerals refer to the same figure elements.

DETAILED DESCRIPTION

Figure 1:
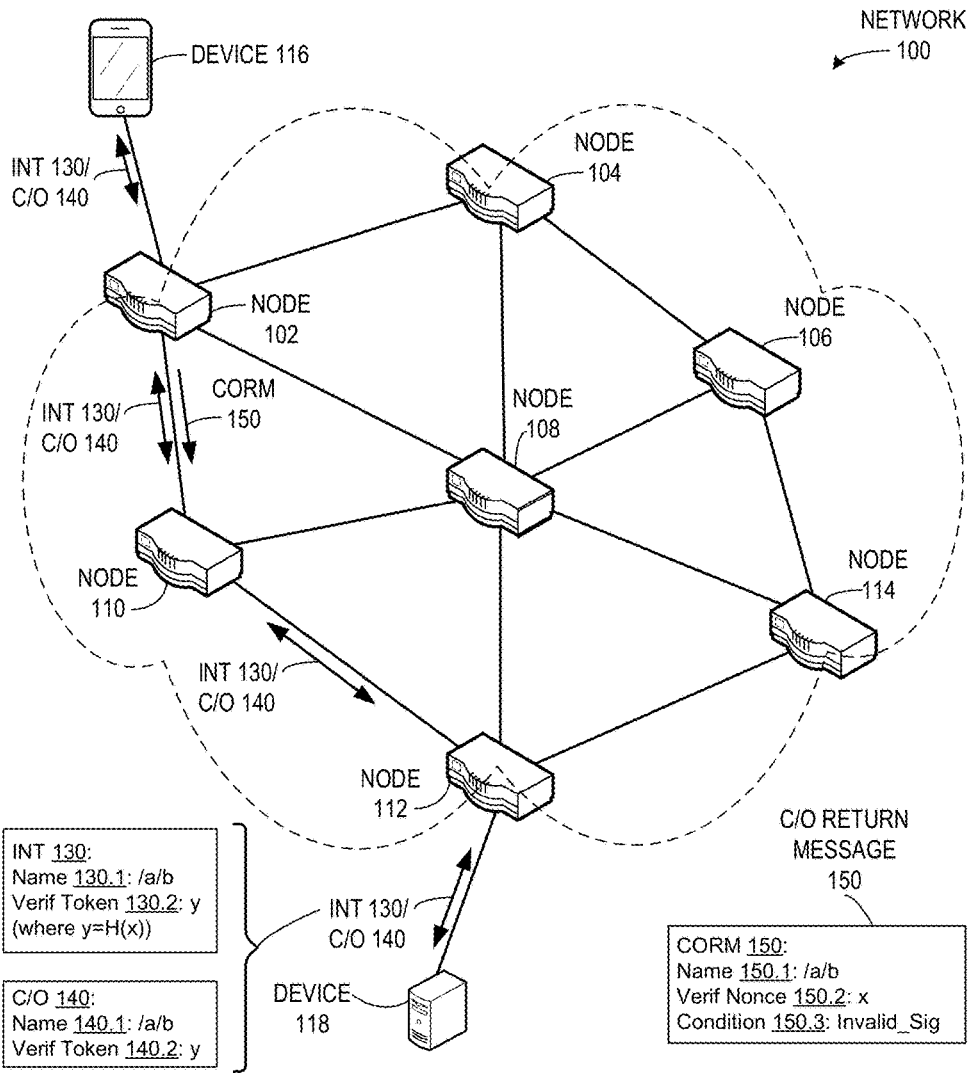
FIG. 1 illustrates an exemplary network that facilitates a node to indicate conditions associated with received content, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system that allows a content-requesting node to provide information about received content to upstream content-sending nodes (e.g., an upstream next-hop node), which allows the upstream nodes to take an appropriate action. Recall that in addition to interest and content object messages, a current CCN protocol also supports interest return messages. A first CCN node can forward an interest to a second CCN node. The second CCN node can receive the interest, encounter errors in processing the interest (such as no available route), and generate an interest return message. The interest return message conveys information to a requesting entity (e.g., the first CCN node or another downstream node) about a problem or condition that occurs while trying to retrieve the requested content object. The first CCN node (or other downstream entity) can use the interest return message to make local forwarding decisions, e.g., to find the desired content along another link. Interest return messages are described in U.S. patent application Ser. No. 14/334,530. Thus, an interest return message allows a recipient of an interest to take action on the interest to retrieve the desired content object Similarly, a recipient of a content object may take action when it receives the content object, such as verifying the signature of the content object and forwarding the content object to all downstream links with matching PIT entries. While a forwarding decision made on a content object may not be meaningful to upstream routers, other actions such as verifying the signature may be meaningful to upstream routers. For example, a downstream router may perform a necessary computation (e.g., verify a signature of a content object) before an upstream router. Currently, there is no mechanism for the downstream router to inform upstream routers of the computation.

To solve this problem, embodiments of the present invention provide a CCN message that is a content object return message. The content object return message forms the last leg of a three-round handshake between two routers participating in an interest and content object exchange. A first node that sends an interest can receive a responsive content object from a second (adjacent and upstream) node. The first node can determine or detect a condition (such as an invalid signature or no matching PIT entry), generate a content object return message, and send the content object return message to the second node. This allows the second node (and any other upstream node that receives the content object return message) to take an action based on information indicated in the content object return message. For example, the second node may discard its cached copy of the associated content object and potentially shut down the upstream link upon which it was received. The protocol can also include elements of security relating to the authenticity of the content object return message.

Specifically, let $R_A$ be the sender of an interest, and let $R_B$ be the immediate upstream router which receives the interest. Furthermore, let I[N], CO[N], and CORM[N] be an interest, a content object, and a content object return message, respectively, with the name N. $R_A$ can generate a random nonce $x \leftarrow \{0,1\}^{256}$ and compute a verification token $y=H(x)$, where H is a cryptographic hash function with a digest output of 256 bits. $R_A$ can transmit I[N] with y to $R_B$. $R_B$ can subsequently forward I[N] (using the same strategy as $R_A$) and retrieve CO[N]. $R_B$ can cache y with CON and forward CO[N] to $R_A$. $R_A$ can determine or detect a condition, generate CORM[N], and transmit CORM[N] with x to $R_B$. $R_B$, in possession of x, can authenticate the content object return message by computing y1=H(x) and verifying that the computed y1 matches its cached version of y.

Note that this protocol defers trust in the content object return message to trust in the original interest. Thus, if $R_B$ trusts interests from $R_A$'s link, $R_B$ also implicitly trusts content object return messages from $R_A$'s link (after verification). Furthermore, the described protocol communication and exchange occurs between two adjacent devices, or between the forwarding engines of devices that are one hop away from each other. In addition, in order to forward I[N], $R_B$ can utilize the same strategy as $R_A$, as long as $R_B$ has a cache. For example, if $R_B$ does not have a cache, $R_B$ can forward [N] with y along to an upstream router. However, if $R_B$ does have a cache, $R_B$ can generate a new nonce x' and compute a new verification token y'=H(x'), and transmit I[N] with y' to an upstream router. Any router that generates or receives a nonce or verification token can cache the nonce or verification token.

Thus, embodiments of the present invention allow a first node (e.g., a content-requesting node) to provide information about received content to a second node (e.g., an upstream adjacent content-sending node), whereby the first node generates and sends a content object return message to the second node. This allows the second node to perform an action, which results in a more efficient system and may decrease the amount of network traffic (e.g., fewer invalid content objects passed downstream) and congestion (e.g., fewer invalid links used as active links). The present invention can also result in increased efficiency (e.g., fewer invalid content objects stored in local caches of intermediate routers).

Thus, these results provide improvements to the distribution of digital content, where the improvements are fundamentally technological. Embodiments of the present invention provide a technological solution (e.g., providing information via verifiable content object return messages to an upstream router, which allows the upstream router to take action, which results in a more efficient system) to the technological problem of the efficient and effective distribution of digital content.

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "Content Object"):

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HS-VLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "Interest"):

A packet that indicates a request for a piece of data, and includes a name (or a name prefix) for the piece of data. A data consumer can disseminate a request or Interest across an information-centric network, which CCN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175.

Exemplary Network and Environment

FIG. 1 illustrates an exemplary network 100 that facilitates a node to indicate conditions associated with received content, in accordance with an embodiment of the present invention. Network 100 can include a content requesting device 116, a content producing device 118, and a router or other forwarding device at nodes 102, 104, 106, 108, 110, 112, and 114. A node can be a computer system, an end-point representing users, and/or a device that can generate interests or originate content. A node can also be an edge router (e.g., CCN nodes 102, 104, 112, and 114) or a core router (e.g., intermediate CCN routers 106, 108, and 110). During operation, client computing device 116 can generate and send an interest 130 with a name 130.1 of "/a/b" and a verification token 130.2 of "y." Verification token 130.2 may be the result of a hash function performed on a randomly generated nonce (e.g., "x"), such that y=H(x). Verification token 130.2 may be subsequently used by a node that receives an interest packet which includes verification token 130.2 to verify a content object return message. Interest 130 can travel through a network (such as a CCN) via nodes or routers 102, 110, and 112, finally reaching content producing device or producer 118. Producer 118 can generate and transmit a responsive content object 140 with a name 140.1 of "/a/b" and a verification token 140.2 of "y." Note that token 140.2 can match token 130.2.

As content object 140 travels back to device 116, each intermediate router (e.g., 112, 110, and 102) can receive and cache content object 140, and determine whether it detects a condition which triggers generation of a content object return message to an upstream node. For example, upon receiving content object 140, node 102 can determine that a condition exists which triggers generation of a content object return message. The condition can include a determination of an invalid signature on the content object message or a lookup in the PIT of the node 102 that returns no matching entry based on the content object name. Node 102 can generate a content object return message 150 with a name 150.1 of "/a/b," a verification nonce 150.2 of "x," and a condition 150.3 of "Invalid_Sig." Node 102 (or a forwarder associated with a computing device at node 102) can forward content object return message 150 to upstream node 110 (or a forwarder associated with a computing device at node 110), where node 102 and 110 are adjacent nodes, and their respective forwarders are adjacent forwarders.

Upon receiving content object return message 150, node 110 can process content object return message 150 based on the information indicated in the content object return message. For example, when content return message 150 includes a condition 150.3 of "Invalid_Sig," node 110 may remove the cached copy of content object 140 from its cache, or node 110 may shut down an upstream link (e.g., corresponding to node 112) from which content object 140 is previously received.

Thus, embodiments of the present invention provide a system that indicates conditions associated with received content. In summary, a first node that requests and receives content can detect a condition associated with the received content, and, based on the detected condition, transmit a content object return message to a second node that sent the content. The second node can receive and process the content object return message based on the information indicated in the content object return message. This facilitates an efficient system which includes, in addition to the interest return message, a content object return message, which in turn provides bi-directional notification messages related to requests for content (i.e., interest return messages in response to interest messages) and responses to requests for content (i.e., content object return messages in response to content object messages).

Role of Content Requesting Device

Figure 2A:
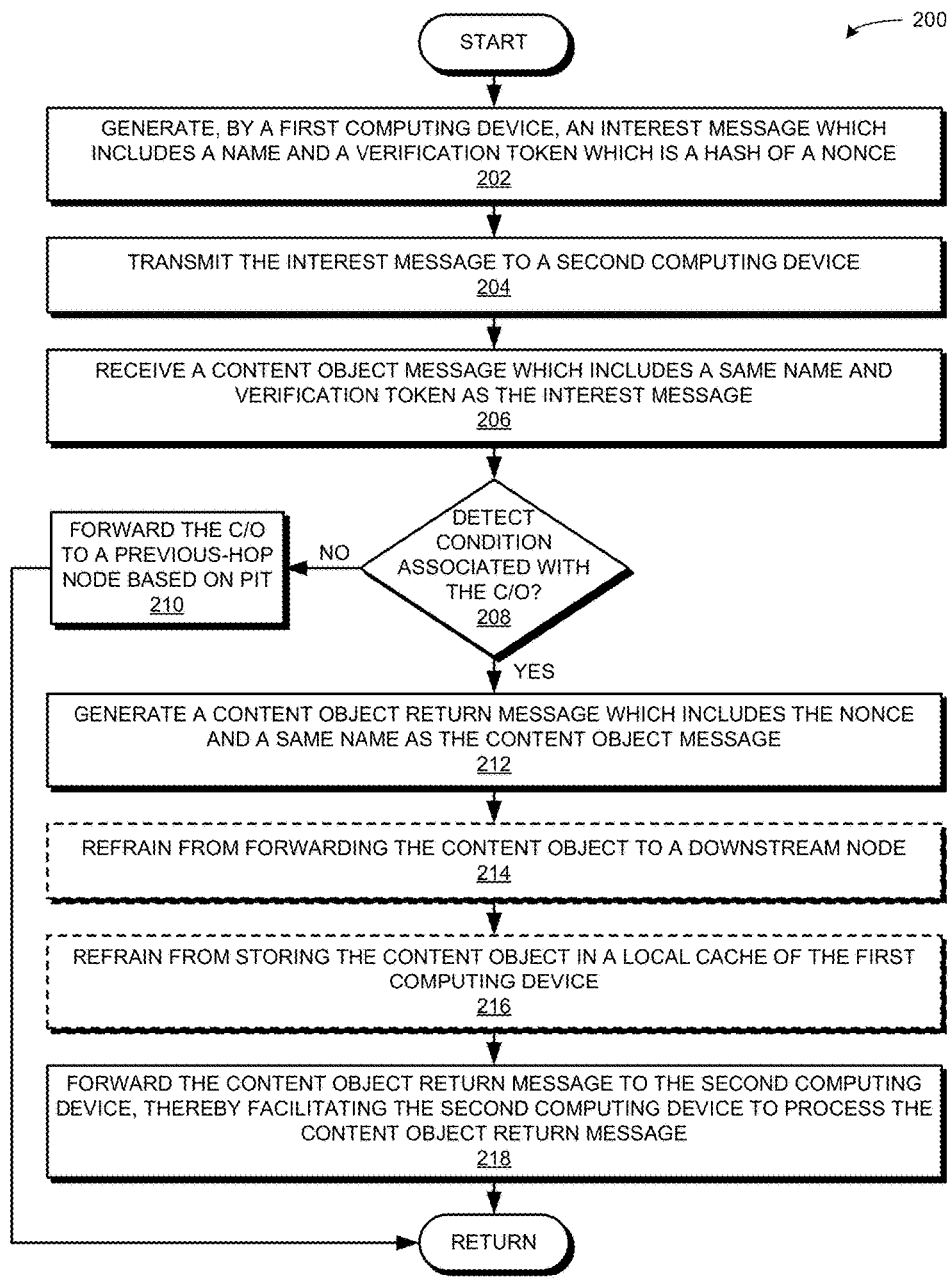
FIG. 2A presents a flow chart illustrating a method by a first computing device for indicating conditions associated with received content, in accordance with an embodiment of the present invention.

FIG. 2A presents a flow chart 200 illustrating a method by a first computing device for indicating conditions associated with received content, in accordance with an embodiment of the present invention. During operation, a first computing device generates an interest message which includes a name and a verification token (y) which is a hash of a nonce (x) (operation 202). The first computing device can generate the nonce randomly, and compute the verification token by performing the hash on the nonce. The first computing device transmits the interest message to a second computing device (operation 204). The first computing device receives a content object message which includes a same name and verification token as the interest message (operation 206). The first computing device determines whether it detects a condition associated with the content object message (decision 208). For example, the first computing device can determine an invalid signature, no matching PIT entry, or other condition, as described below in relation to FIG. 2B. If the first computing device does not detect a condition associated with the content object message, the first computing device forwards the content object message to a previous-hop node based on a corresponding PIT entry (operation 210).

If the first computing device does detect a condition associated with the content object message, the first computing device generates a content object return message which includes the nonce and a same name as the content object message (operation 212). Depending on a strategy of the first computing device and the detected condition, the first computing device can refrain from forwarding the content object message to a downstream node (operation 214). The first computing device can also refrain from storing the content object message in its local cache (operation 216). The first computing device forwards the content object return message to the second computing device, thereby facilitating the second computing device to process the content object return message (operation 218).

Figure 2B:
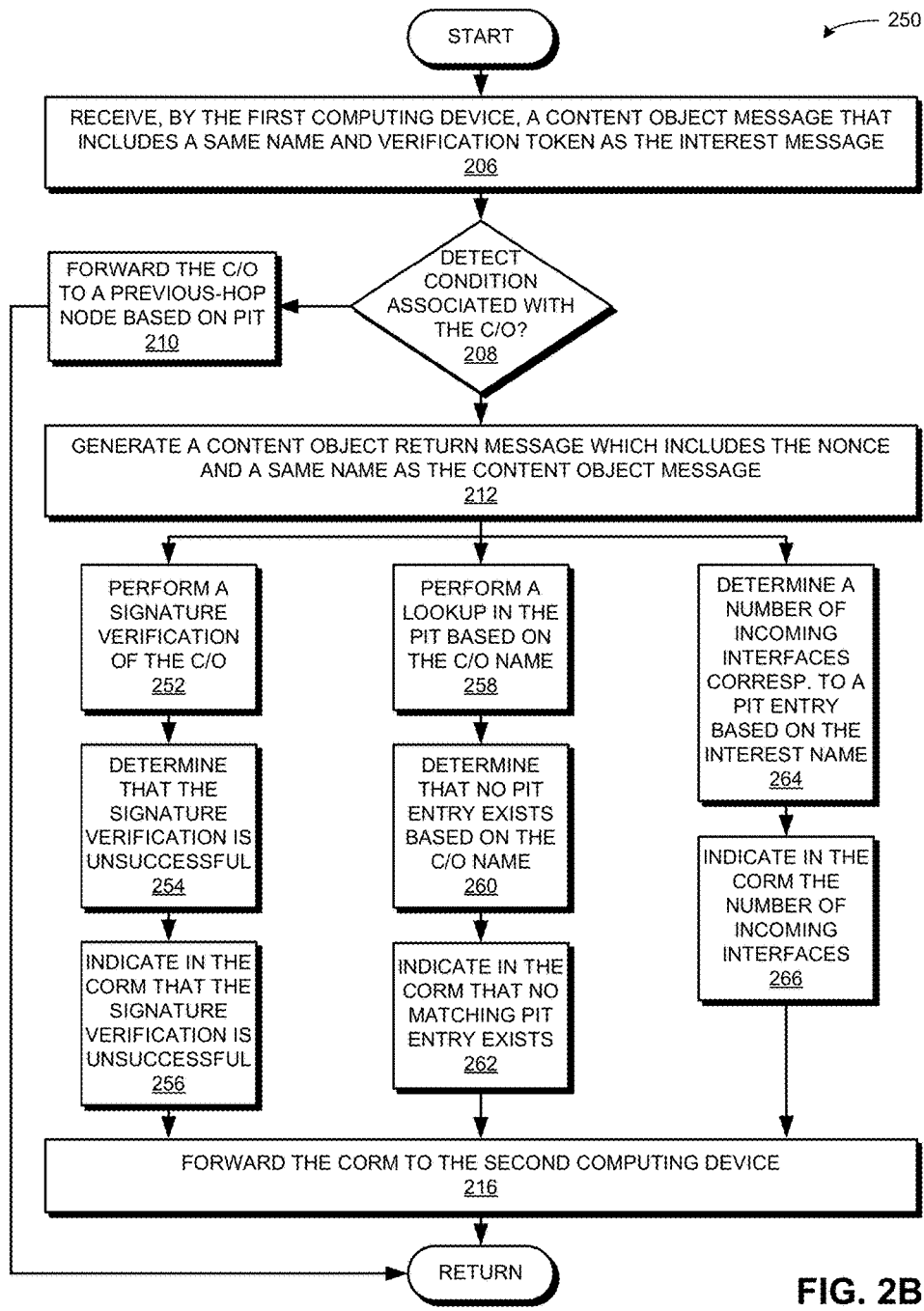
FIG. 2B presents a flow chart illustrating a method by a first computing device for indicating conditions associated with received content, including exemplary detected conditions, in accordance with an embodiment of the present invention.

FIG. 2B presents a flow chart 250 illustrating a method by a first computing device for indicating conditions associated with received content, including exemplary detected conditions, in accordance with an embodiment of the present invention. Similar to the operations described in relation to FIG. 2A, the first computing device receives a content object message which includes a same name and verification token as the interest message (operation 206), determines whether it detects a condition associated with the content object message (decision 208), and if not, forwards the content object message to a previous-hop node based on a corresponding PIT entry (operation 210). If it does detect a condition associated with the content object message, the first computing device generates a content object return message which includes the nonce and a same name as the content object message (operation 212).

The first computing device can detect several types of conditions. The first computing device can perform a signature verification of the content object message (operation 252). For example, the first computing device can check a KeyID field or other signature information data in the content object message. The first computing device can determine that the signature verification is unsuccessful (operation 254), and indicate in the content object return message that the signature verification is unsuccessful (operation 256). The first computing device can also perform a lookup in the PIT based on the content object name (operation 258). The first computing device can determine that no matching PIT entry exists based on the content object name (operation 260) (i.e., that there is no currently pending interest for content by that name), and indicate in the content object return message that no matching PIT entry exists (operation 262). In the case of both of these conditions (invalid signature and no matching PIT entry), the first computing device can refrain from forwarding the content object to a downstream node and/or from storing the content object in its local cache (as described above in relation to operations 214 and 216, respectively, of FIG. 2A).

The first computing device can also determine a number of incoming interfaces corresponding to a matching PIT entry based on the interest name (operation 264). The first computing device can indicate in the content object return message the number of incoming interfaces (operation 266), which allows the second computing device to act based on that information. For example, the second computing device can be a caching server or service which may keep track of the number of outstanding interests for content based on a specific name, and can act accordingly based on that information as included in a content object return message. Subsequently, the first computing device forwards the content object return message to the second computing device (operation 216).

Role of Content Providing Device

Figure 3A:
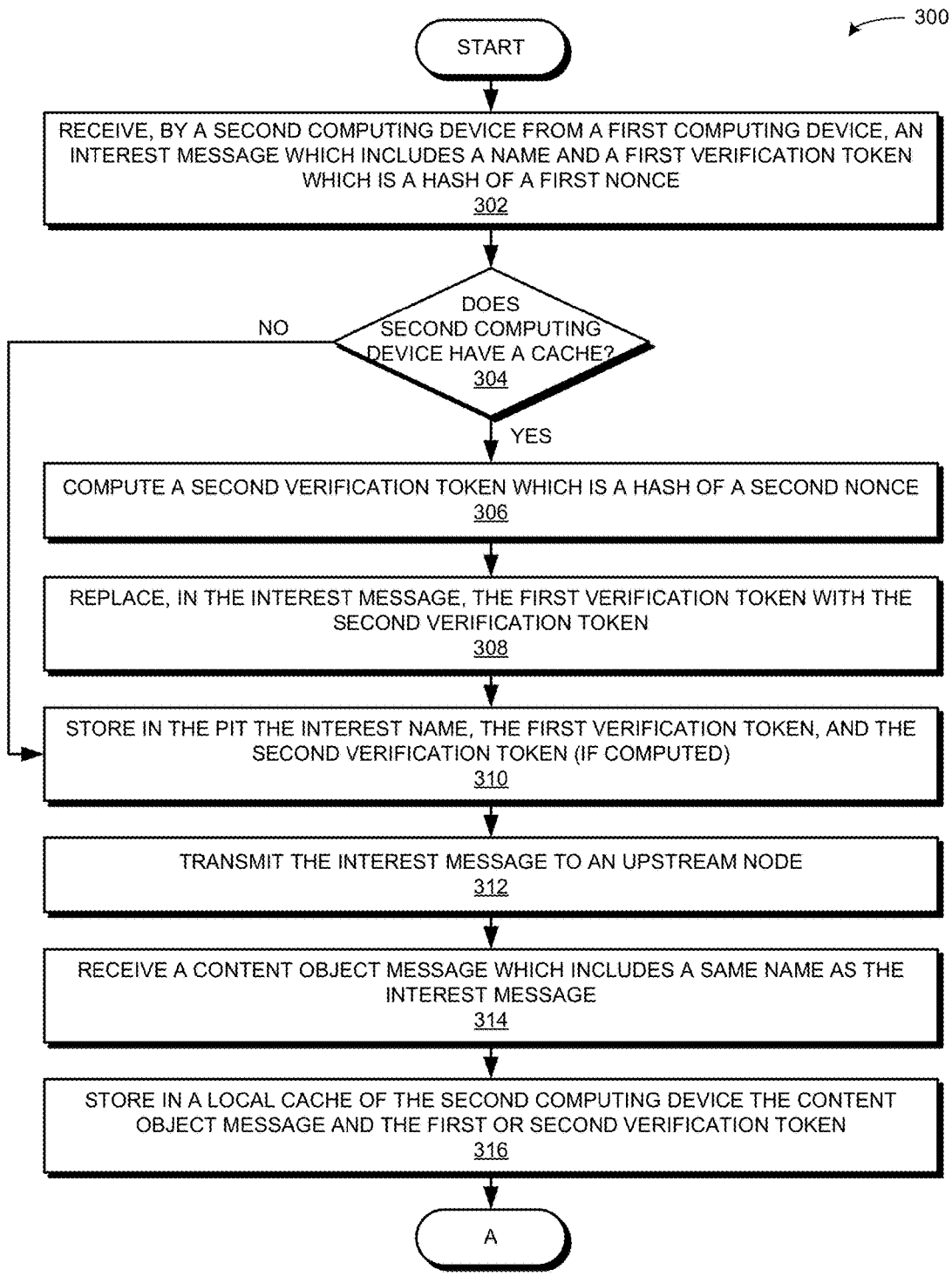
FIG. 3A presents a flow chart illustrating a method by a second computing device for processing conditions associated with content received by a first computing device, in accordance with an embodiment of the present invention.

FIG. 3A presents a flow chart 300 illustrating a method by a second computing device for processing conditions associated with content received by a first computing device, in accordance with an embodiment of the present invention. The received content is previously transmitted by the second computing device. During operation, the system receives, by a second computing device from a first computing device, an interest message which includes a name and a first verification token (y) which is a hash of a first nonce (x) (operation 302). The system determines whether the second computing device has a cache (decision 304). If it does not, the system stores in the PIT the interest name and the first verification token (operation 310). If the second computing device does have a cache, the system computes a second verification token which is a hash of a second nonce (operation 306). The system replaces, in the first interest message, the first verification token with the second verification token (operation 308). The system stores in the PIT the interest name, the first verification token, and the second verification token (if computed) (operation 310). The first verification token can be associated with an incoming interface, and the second verification token can be associated with an outgoing interface.

Thus, the second computing device participates in the content exchange protocol by generating a new verification token to provide to an adjacent device (e.g., an upstream router). That is, a forwarder of the second computing device generates and provides a new verification token to a forwarder of an adjacent device or next-hop node of the second computing device. This allows a node (e.g., the second computing device) that receives a responsive content object to provide sufficient authentication information back downstream to another node (e.g., the first computing device), which can generate a content object return message, which is transmitted back to the second computing device, all the while exchanging sufficient authentication information, as described above in relation to FIG. 1.

Returning to FIG. 3A, the system transmits the interest message to an upstream node (operation 312). Subsequently, the system receives a content object message which includes a same name as the interest message (operation 314). Note that the received content object message may also include the first verification token. The system stores in a local cache of the second computing device the content object message and the first or second verification token (operation 316). For example, if the interest is transmitted without replacing the verification token (e.g., the second computing device has no cache), the system can store the first verification token. If the interest is transmitted by replacing the verification token (e.g., the second computing device does have a cache), the system can store the second verification token. The operation then continues as described at Label A of FIG. 3B.

Figure 3B:
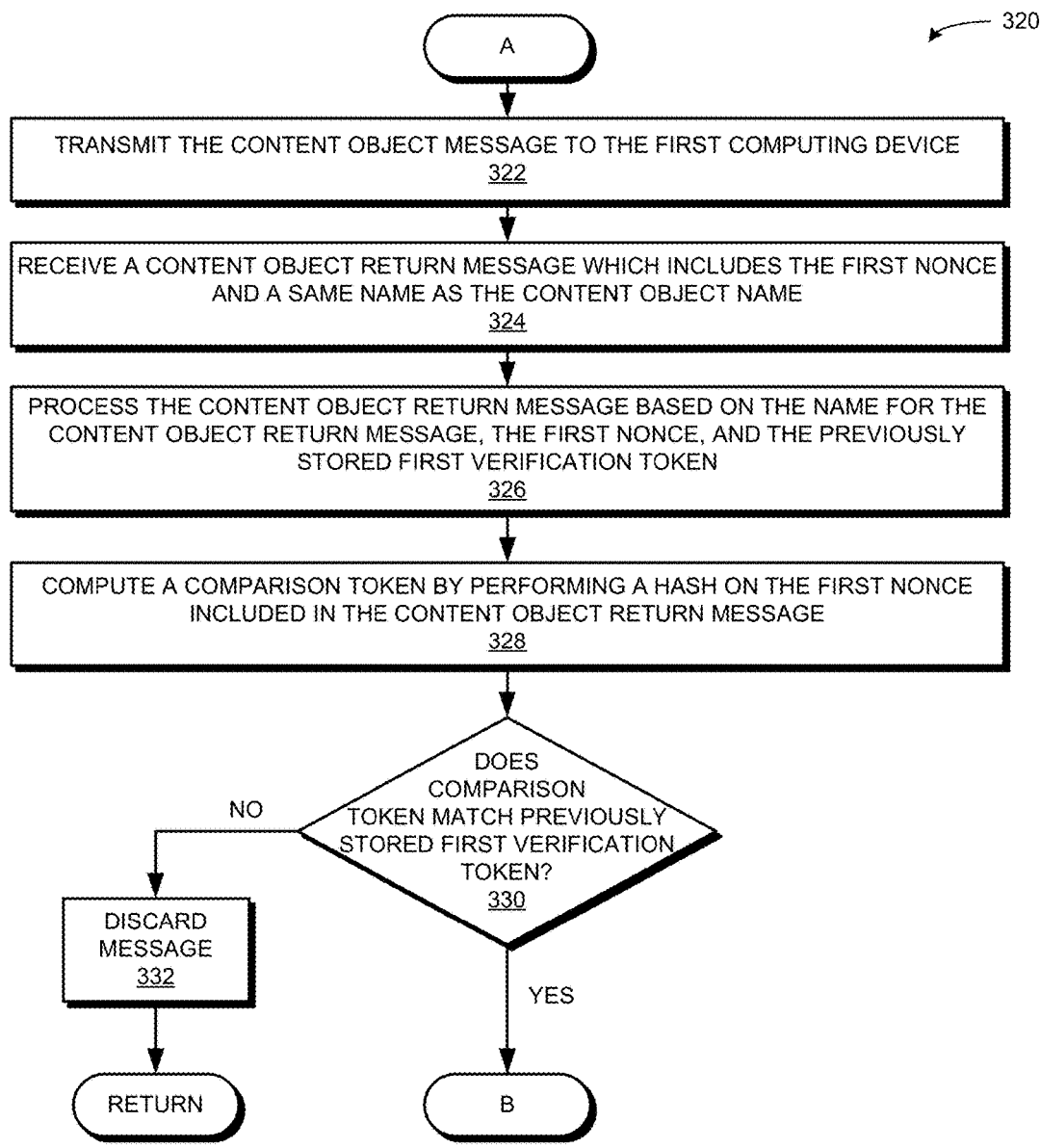
FIG. 3B presents a flow chart illustrating a method by a second computing device for processing conditions associated with content received by a first computing device, in accordance with an embodiment of the present invention.

FIG. 3B presents a flow chart 320 illustrating a method by a second computing device for processing conditions associated with content received by a first computing device, in accordance with an embodiment of the present invention. The received content is previously transmitted by the second computing device. During operation, the system transmits, by the second computing device, the content object message to the first computing device (operation 322). Subsequently, the system receives a content object return message which includes the first nonce and a same name as the content object name (operation 324). The system processes the content object return message based on the name for the content object return message, the first nonce, and the stored first verification token (operation 326). The system computes a comparison token by performing a hash on the first nonce which was included in the content object return message (operation 328). The system determines whether the comparison token matches the previously stored first verification token (decision 330). If it does not, the system can discard the message (operation 332). If the comparison token does match the first verification token, the operation continues as described at Label B of FIG. 3C.

Figure 3C:
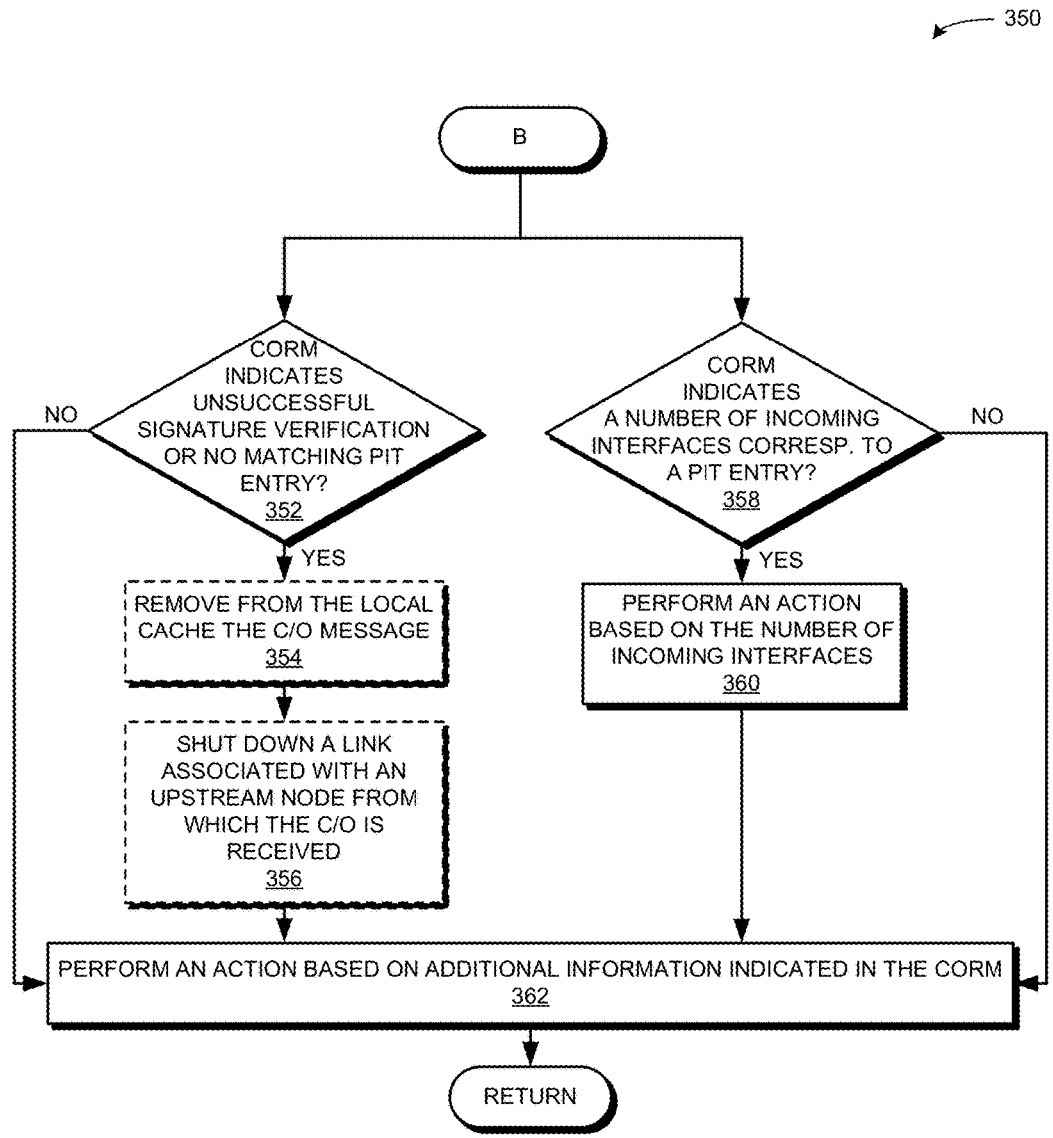
FIG. 3C presents a flow chart illustrating a method by a second computing device for processing conditions associated with content received by a first computing device, in accordance with an embodiment of the present invention.

FIG. 3C presents a flow chart 350 illustrating a method by a second computing device for processing conditions associated with content received by a first computing device, in accordance with an embodiment of the present invention. The received content is previously transmitted by the second computing device. If the system does not indicate an unsuccessful verification or no matching PIT entry (decision 352), or if the system does not indicates a number of incoming interfaces corresponding to a PIT entry (decision 358), the system performs an action based on additional information indicated in the content object return message.

If the content object return message does indicate either an unsuccessful signature verification or no matching PIT entry (decision 352), the system can optionally remove from the local cache the content object message (operation 354), and can also optionally shut down a link associated with an upstream node from which the content object is received (operation 356). If the content object return message does indicate a number of incoming interfaces corresponding to a PIT entry (decision 358), the system can perform an action based on the number of incoming interfaces (operation 360). The system can also perform an action based on additional information indicated in the content object return message (operation 362).

Role of Router or Intermediate Node

Note that the operations described in relation to FIGS. 2A and 2B can be performed by a content requesting device (such as device 116 in FIG. 1), or by any intermediate router that is acting as a content requesting node (such as node 102 in FIG. 1). In addition, the operations described in relation to FIGS. 3A, 3B, and 3C can be performed by any content providing device (such as device 118 in FIG. 1), or by any intermediate router that is acting as a content providing node or a content sending node (such as node 110 In FIG. 1).

Exemplary Interest, Content Object, and Content Object Return Message

Figure 4A:
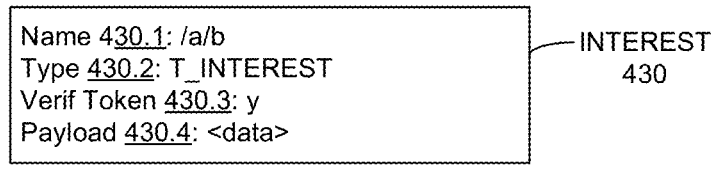
FIG. 4A illustrates an exemplary interest message, in accordance with an embodiment of the present invention.

FIG. 4A illustrates an exemplary interest message 430, in accordance with an embodiment of the present invention. Interest 430 can include a name 430.1 of "/a/b," a type 430.2 of "T_INTEREST," a verification token 430.3 with a value of "y," and a payload 430.4 of "<data>." Verification token 430.3 may be the result of a hash function performed on a randomly generated nonce (e.g., "x"), such that y=H(x). Verification token 430.3 may be subsequently used by a node that receives an interest packet which includes verification token 430.3 to verify a content object return message, which includes the nonce, x. Interest 430 may be generated by client computing device 116 of FIG. 1, and transmitted or forwarded by device 116 or any of nodes 102, 110, and 112 of FIG. 1.

Figure 4B:
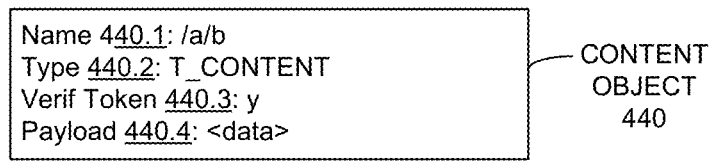
FIG. 4B illustrates an exemplary content object message, in accordance with an embodiment of the present invention.

FIG. 4B illustrates an exemplary content object message 440, in accordance with an embodiment of the present invention. Content object 440 can include a name 440.1 of "/a/b," a type 440.2 of "T_CONTENT," a verification token 440.3 with a value of "y," and a payload 440.4 of "<data>." Content object 440 may be generated by content producing device 118 of FIG. 1, and transmitted or forwarded by device 118 or any of nodes 112, 110, and 102.

Figure 4C:
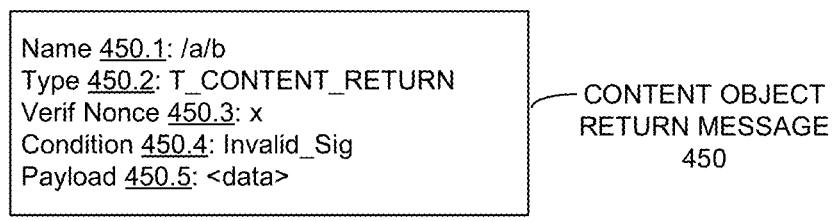
FIG. 4C illustrates an exemplary content object return message, in accordance with an embodiment of the present invention.

FIG. 4C illustrates an exemplary content object return message 450, in accordance with an embodiment of the present invention. Content object return message 450 can include a name 450.1 of "/a/b," a type 450.2 of "T_CONTENT_RETURN," a verification nonce 450.3 with a value of "x," a condition 450.4 of "Invalid_Sig," and a payload 450.5 of "<data>." Condition 450.4 can indicate information that is the result of a computation or lookup, such as, respectively, an invalid signature (e.g., "Invalid_Sig") or no matching PIT entry (e.g., "No_PIT_Entry"). Condition 450.4 can also include information that a receiving upstream node may use to perform an action, such as a number of incoming interfaces corresponding to a PIT entry based on a name (e.g., "Num_Inc_Interf=5").

Verification nonce 450.3 can be a nonce randomly generated by a content requesting device that transmitted interest 430 (e.g., device 116 or any of nodes 102, 110, and 112 of FIG. 1). Verification nonce 450.3 can also be used by an upstream content sending device (e.g., node 110 as an upstream router of node 102) to verify the authenticity of content object return message 450.3. For example, node 110 can receive content object return message 450, which includes verification nonce 450.3, and compute a comparison verification token y' by performing a hash on verification nonce 450.3 (i.e., y'=H(x)). Node 110 can subsequently compare y' with verification token 430.3 y, which was previously received as part of interest 430 and stored by node 110 in its local cache as associated with name 430.1. If there is a match, node 110 can proceed to process content object return message 450 accordingly. If there is no match, match 110 can discard content object return message 450.

Note that while content object return message 450 is depicted as including verification nonce 450.3 and condition 450.4 as fields, this information can also be included in a pre-pended header, an encapsulation header, an appended tail header, or other method.

Exemplary Computer System

Figure 5:
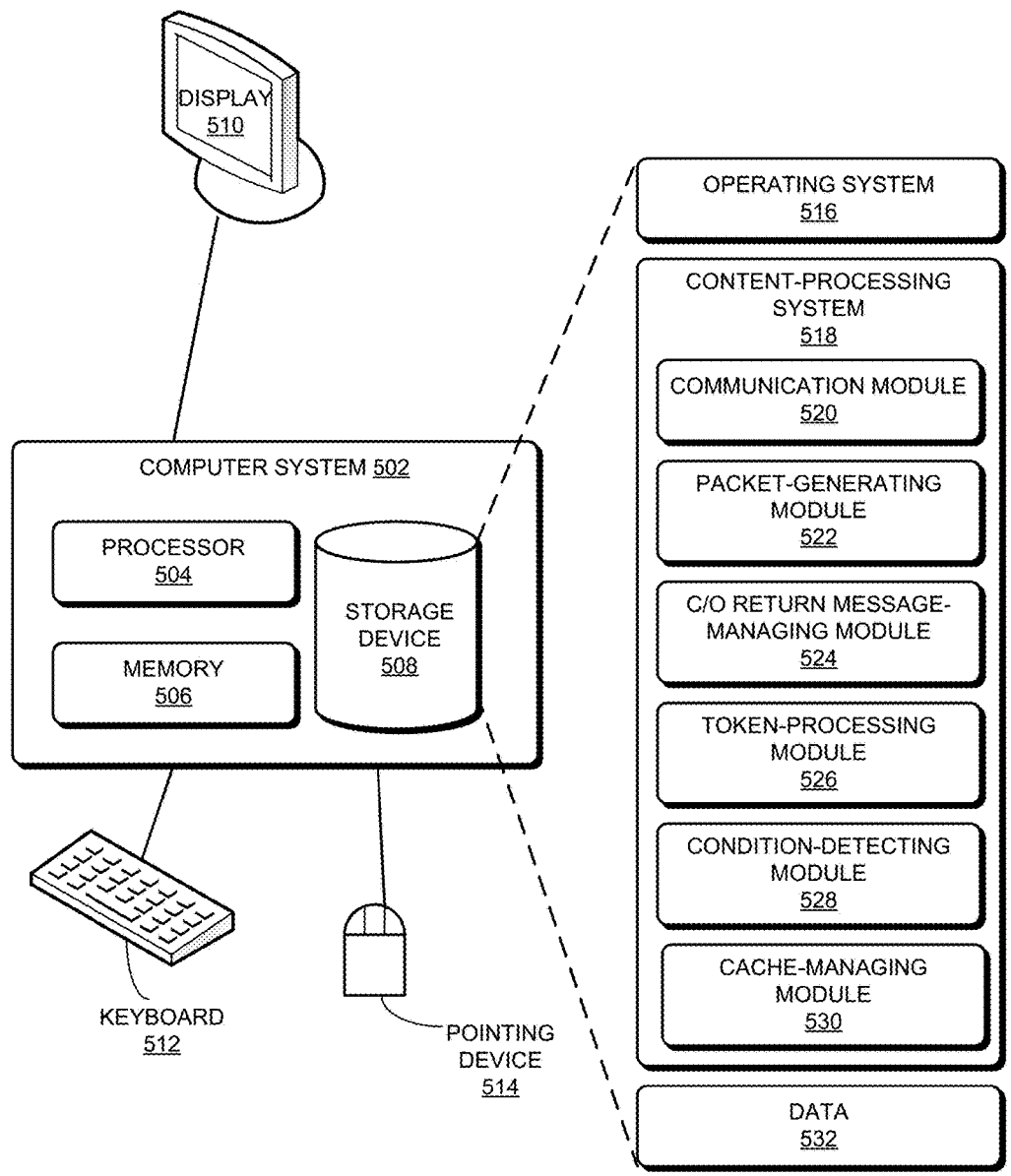
FIG. 5 illustrates an exemplary computer and communication system that facilitates a node to indicate conditions associated with received content, in accordance with an embodiment of the present invention.

FIG. 5 illustrates an exemplary computer and communication system 502 that facilitates indicating conditions associated with received content, in accordance with an embodiment of the present invention. Computer and communication system 502 includes a processor 504, a memory 506, and a storage device 508. Memory 506 can include a volatile memory (e.g., RAM) that serves as a managed memory, and can be used to store one or more memory pools. Furthermore, computer and communication system 502 can be coupled to a display device 510, a keyboard 512, and a pointing device 514. Storage device 508 can store an operating system 516, a content-processing system 518, and data 532.

Content-processing system 518 can include instructions, which when executed by computer and communication system 502, can cause computer and communication system 502 to perform methods and/or processes described in this disclosure. Specifically, content-processing system 518 may include instructions for generating, by a first computing device, an interest message which includes a name and a verification token which is a hash of a nonce (packet-generating module 522). Content-processing system 518 can include instructions for, in response to transmitting the interest message to a second computing device, receiving a content object message which includes a same name as the name for the interest message (communication module 520). Content-processing system 518 can include instructions for, in response to detecting a condition associated with the content object message (condition-detecting module 528), generating a content object return message which includes the nonce and a same name as the name for the content object message (content object return message-managing module 524). Content-processing system 518 can include instructions for forwarding the content object return message to the second computing device (communication module 520).

Content-processing system 518 can also include instructions for generating the nonce randomly and computing the verification token by performing the hash on the nonce (packet-generating module 522). Content-processing system 518 can include instructions for refraining from forwarding the content object to a downstream node and refraining from storing the content object in a local cache of the first computing device (condition-detecting module 528).

Content-processing system 518 can further include instructions for performing a signature verification of the content object and determining that the signature verification is unsuccessful (condition-detecting module 528). Content-processing system 518 can include instructions for indicating in the content object return message that the signature verification is unsuccessful (content object return message-managing module 524). Content-processing system 518 can also include instructions for performing a lookup in a pending interest table of the first computing device based on the name for the content object message, and determining from the lookup that no corresponding entry exists in the pending interest table of the first computing device (condition-detecting module 528). Content-processing system 518 can include instructions for indicating in the content object return message that no corresponding entry exists in the pending interest table of the first computing device (content object return message-managing module 524). Content-processing system 518 can additionally include instructions for determining a number of incoming interfaces corresponding to an entry in a pending interest table of the first computing device based on the name for the interest message (condition-detecting module 528), and for indicating in the content object return message the number of incoming interfaces (content object return message-managing module 524).

Content-processing system 518 can further include instructions for receiving, by a second computing device from a first computing device, an interest message which includes a name and a first verification token which is a hash of a first nonce (communication module 520). Content-processing system 518 can include instructions for retrieving a content object message which includes a same name as the name for the interest message (communication module 520). Content-processing system 518 can include instructions for storing in a local cache of the second computing device the content object message and the first verification token (cache-managing module 530). Content-processing system 518 can include instructions for, in response to transmitting the content object message to the first computing device, receiving a content object return message which includes the first nonce and a same name as the name for the content object message (communication module 520). Content-processing system 518 can include instructions for processing the content object return message based on the name for the content object return message, the first nonce, and the previously stored first verification token (content object return message-managing module 524).

Content-processing system 518 can include instructions for, in response to determining that the second computing device has a local cache (cache-managing module 530): computing a second verification token which is a hash of a second nonce (packet-generating module 522); replacing, in the interest message, the first verification token with the second verification token (packet-generating module 522); storing in a data structure the name for the interest message, the first verification token, and the second verification token (packet-generating module 522); and transmitting the interest message to an upstream node (communication module 520). Content-processing system 518 can also include instructions for, in response to determining that the second computing device does not have a local cache (cache-managing module 530), transmitting the interest message to an upstream node (communication module 520).

Content-processing system 518 can include instructions for computing a third verification token by performing a hash on the first nonce included in the content object return message (token-processing module 526). Content-processing system 518 can also include instructions for determining whether the third verification token matches the first verification token included in the interest message (token-processing module 526). Content-processing system 518 can include instructions for removing from the local cache the content object message (cache-managing module 530), and shutting down a link associated with an upstream node from which the content object is received (content-object return message-processing module 524). Content-processing system 518 can include instructions for performing an action based on a number of incoming interfaces corresponding to an entry in a pending interest table of the first computing device based on the name for the interest message (content-object return message-processing module 524).

Data 532 can include any data that is required as input or that is generated as output by the methods and/or processes described in this disclosure. Specifically, data 532 can store at least: a packet that corresponds to an interest, a content object, or a content object return message; a name; a name for an interest, a content object, or a content object return message; a notification message; a hierarchically structured variable length identifier; a condition associated with a content object; a signature for a content object; a random nonce; a token; a hash function; a verification token which is the result of a hash function; a data structure; a pending information table (PIT); a forwarding information base (FIB); a cache or content store (CS); a link or other information which indicates an upstream router, a next-hop node, a downstream router, or a previous-hop node; a forwarder; an indication or indicator that a signature verification is invalid or that no matching PIT entry exists for a given name; an entry in a PIT; a number of incoming interfaces corresponding to a PIT entry; and an indication or indicator of the number of incoming interfaces.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system, comprising:
 a processor; and
 a storage device storing instructions that when executed by the processor cause the processor to perform a method, the method comprising:

generating, by a first computing device, an interest message which includes a name and a verification token which is a hash of a nonce, wherein a name is a hierarchically structured variable length identifier that includes contiguous name components;

in response to transmitting the interest message to a second computing device, receiving a content object message which includes a same name as the name for the interest message;

in response to detecting a condition associated with the content object message, generating a content object return message which includes the nonce and a same name as the name for the content object message; and forwarding the content object return message to the second computing device, thereby facilitating the second computing device to process the content object.

2. The computer system of claim 1, wherein the method further comprises:
generating the nonce randomly; and
computing the verification token by performing the hash on the nonce.

3. The computer system of claim 1, wherein in response to detecting the condition, the method further comprises:
refraining from forwarding the content object to a downstream node; and
refraining from storing the content object in a local cache of the first computing device.

4. The computer system of claim 1, wherein detecting the condition further comprises:
performing a signature verification of the content object;
determining that the signature verification is unsuccessful; and
indicating in the content object return message that the signature verification is unsuccessful.

5. The computer system of claim 1, wherein detecting the condition further comprises:
performing a lookup in a pending interest table of the first computing device based on the name for the content object message;
determining from the lookup that no corresponding entry exists in the pending interest table of the first computing device; and
indicating in the content object return message that no corresponding entry exists in the pending interest table of the first computing device.

6. The computer system of claim 1, wherein detecting the condition further comprises:
determining a number of incoming interfaces corresponding to an entry in a pending interest table of the first computing device based on the name for the interest message; and
indicating in the content object return message the number of incoming interfaces.

7. The computer system of claim 1, wherein the first computing device and the second computing device communicate via a respective forwarder associated with each computing device, and wherein the second computing device is a next-hop node of the first computing device.

8. A computer system, comprising:
a processor; and
a storage device storing instructions that when executed by the processor cause the processor to perform a method, the method comprising:
receiving, by a second computing device from a first computing device, an interest message which includes a name and a first verification token which is a hash of a first nonce, wherein a name is a hierarchically structured variable length identifier that includes contiguous name components;

retrieving a content object message which includes a same name as the name for the interest message;

storing in a local cache of the second computing device the content object message and the first verification token;

in response to transmitting the content object message to the first computing device, receiving a content object return message which includes the first nonce and a same name as the name for the content object message; and processing the content object return message based on the name for the content object return message, the first nonce, and the stored first verification token.

9. The computer system of claim 8, wherein retrieving the content object message further comprises:
in response to determining that the second computing device has a local cache:
computing a second verification token which is a hash of a second nonce;
replacing, in the interest message, the first verification token with the second verification token;
storing in a data structure the name for the interest message, the first verification token, and the second verification token; and
transmitting the interest message to an upstream node; and
in response to determining that the second computing device does not have a local cache, transmitting the interest message to an upstream node.

10. The computer system of claim 9, wherein the first verification token is associated with an incoming interface, and wherein the second verification token is associated with an outgoing interface.

11. The computer system of claim 8, wherein processing the content object return message further comprises:
computing a third verification token by performing a hash on the first nonce included in the content object return message; and
determining whether the third verification token matches the first verification token included in the interest message.

12. The computer system of claim 8, wherein the content object return message indicates that a signature verification performed by the first computing device is unsuccessful or that no corresponding entry exists in a pending interest table of the first computing device based on the name for the content object message, and
wherein processing the content object return message further comprises one or more of:
removing from the local cache the content object message; and
shutting down a link associated with an upstream node from which the content object is received.

13. The computer system of claim 8, wherein the content object return message indicates a number of incoming interfaces corresponding to an entry in a pending interest table of the first computing device based on the name for the interest message, and
wherein processing the content object return message further comprises:
performing an action based on the number of incoming interfaces.

14. A computer-implemented method for facilitating content object return messages, the method comprising:

generating, by a first computing device, an interest message which includes a name and a verification token which is a hash of a nonce, wherein a name is a hierarchically structured variable length identifier that includes contiguous name components;

in response to transmitting the interest message to a second computing device, receiving a content object message which includes a same name as the name for the interest message;

in response to detecting a condition associated with the content object message, generating a content object return message which includes the nonce and a same name as the name for the content object message;

forwarding the content object return message to the second computing device, thereby facilitating the second computing device to process the content object.

15. The method of claim 14, further comprising:

generating the nonce randomly; and computing the verification token by performing the hash on the nonce.

16. The method of claim 14, wherein in response to detecting the condition, the method further comprises:

refraining from forwarding the content object to a downstream node; and refraining from storing the content object in a local cache of the first computing device.

17. The method of claim 14, wherein detecting the condition further comprises:

performing a signature verification of the content object;

determining that the signature verification is unsuccessful; and indicating in the content object return message that the signature verification is unsuccessful.

18. The method of claim 14, wherein detecting the condition further comprises:

performing a lookup in a pending interest table of the first computing device based on the name for the content object message;

determining from the lookup that no corresponding entry exists in the pending interest table of the first computing device; and indicating in the content object return message that no corresponding entry exists in the pending interest table of the first computing device.

19. The method of claim 14, wherein detecting the condition further comprises:

determining a number of incoming interfaces corresponding to an entry in a pending interest table of the first computing device based on the name for the interest message; and indicating in the content object return message the number of incoming interfaces.

20. The method of claim 14, wherein the first computing device and the second computing device communicate via a respective forwarder associated with each computing device, and wherein the second computing device is a next-hop node of the first computing device.

* * * * *